Feb. 19, 1929.
G. K. DAVOL
1,702,467
INTERNAL COMBUSTION ENGINE
Filed Oct. 26, 1925   5 Sheets-Sheet 1
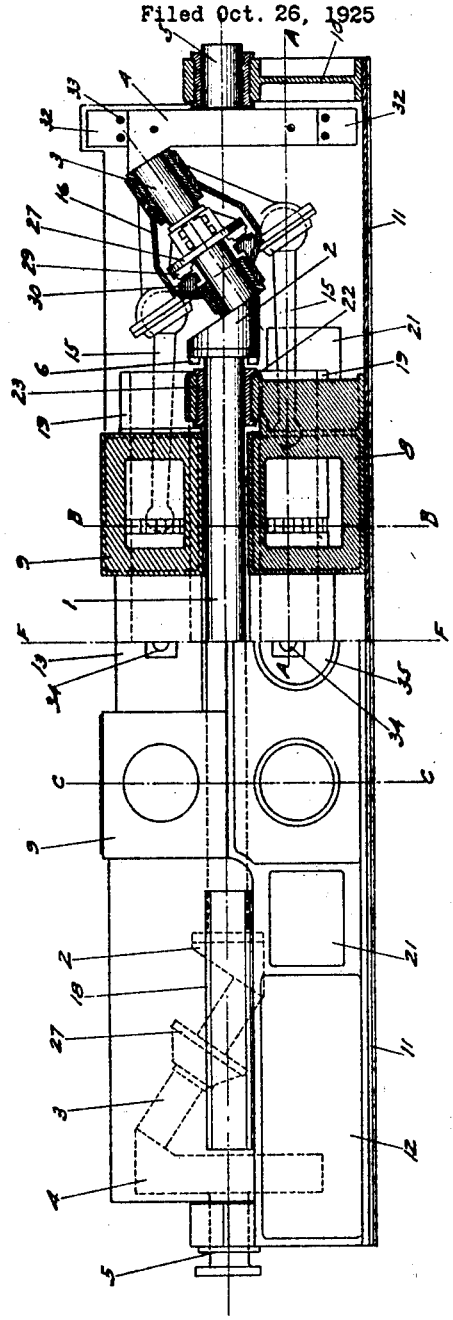
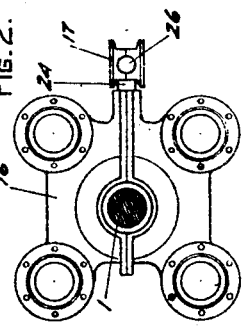
INVENTOR.
George K. Davol.
BY
ATTORNEYS.

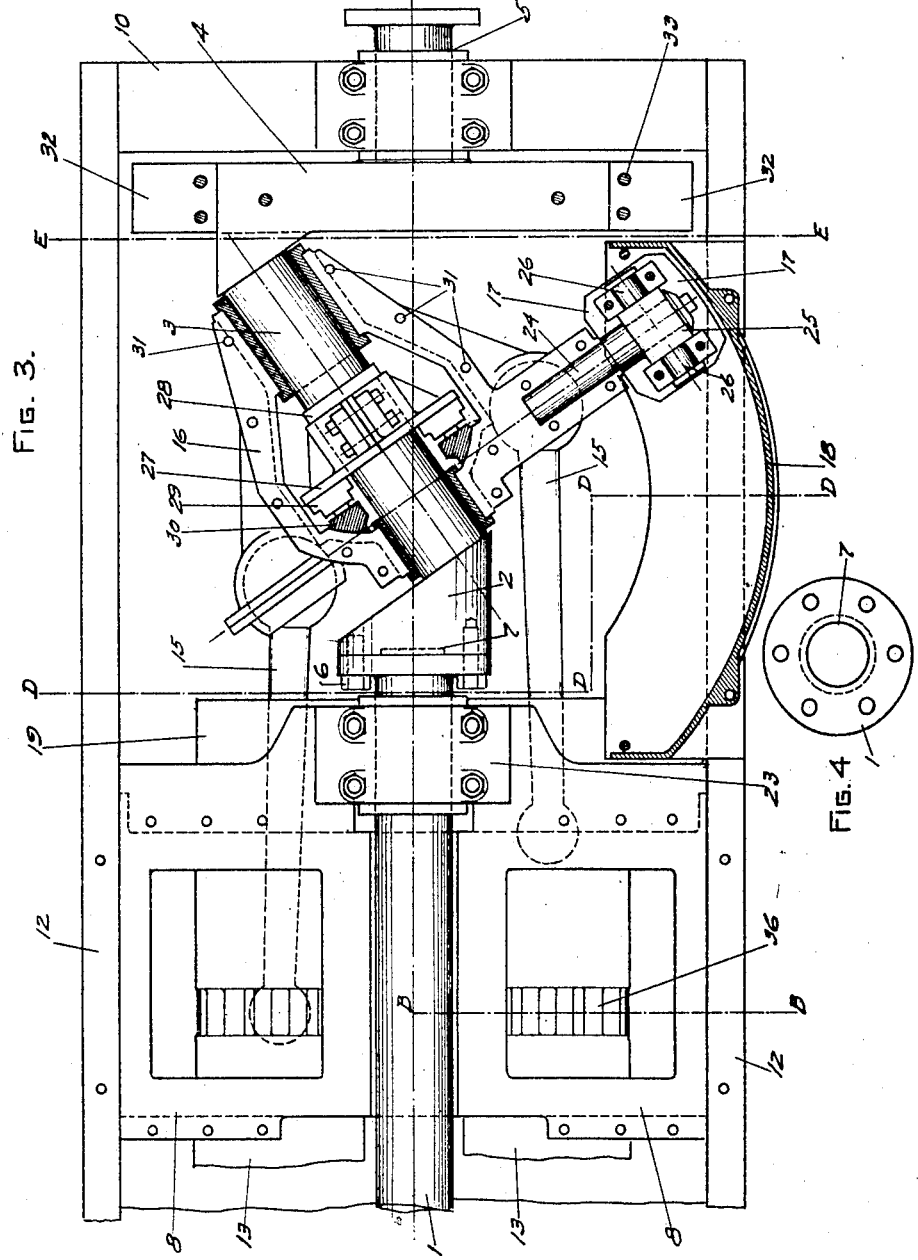

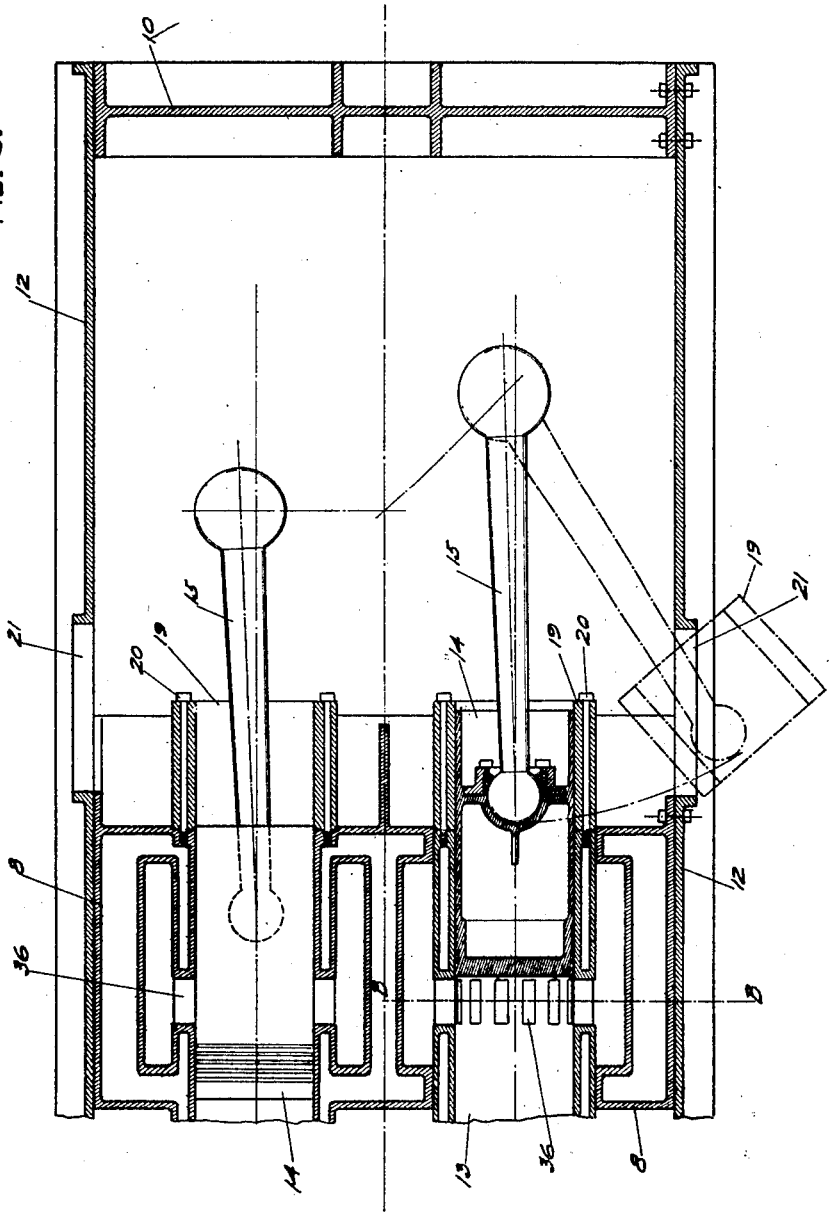

Feb. 19, 1929.
G. K. DAVOL
1,702,467
INTERNAL COMBUSTION ENGINE
Filed Oct. 26, 1925  5 Sheets-Sheet 4
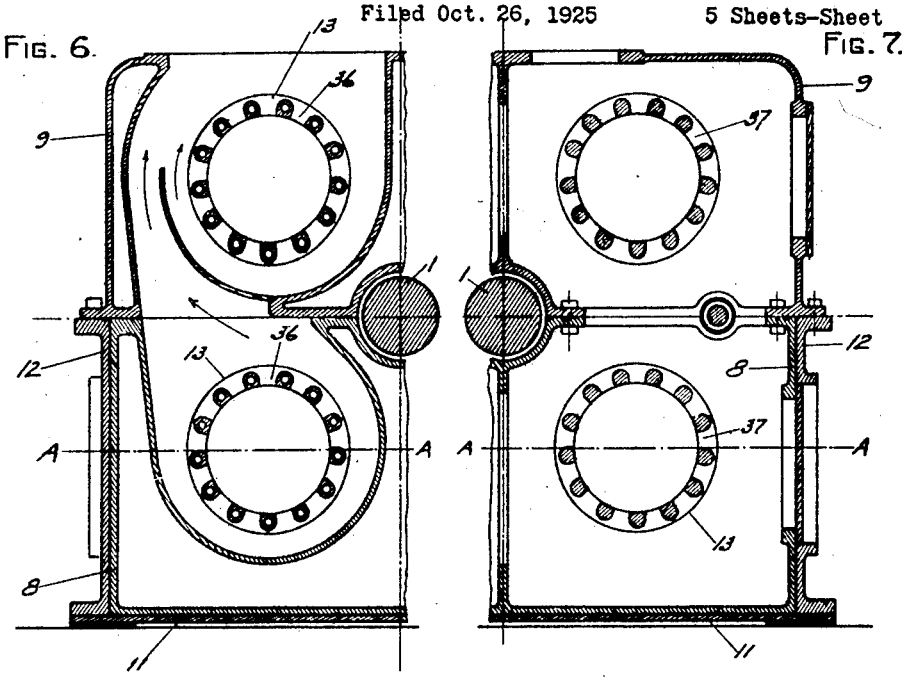
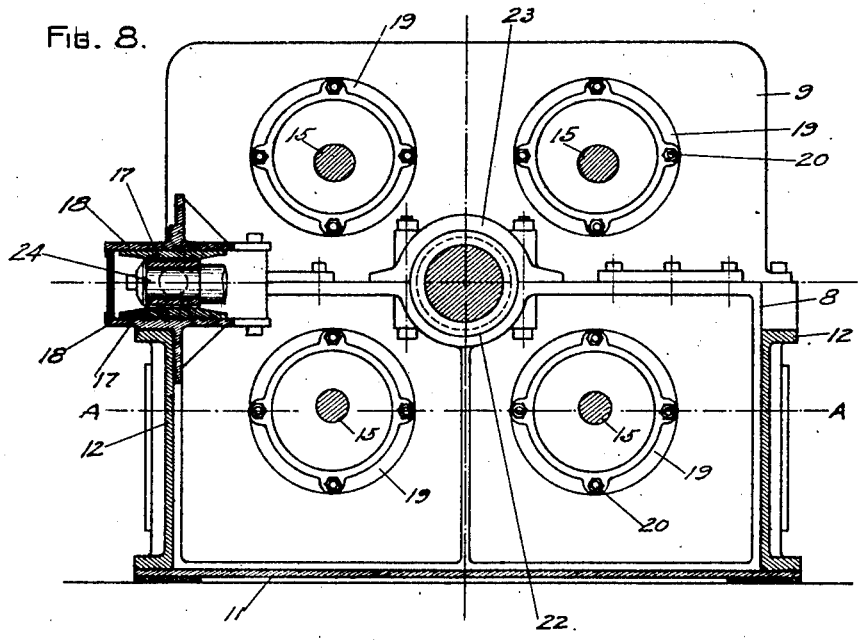
INVENTOR.
George K. Davol.
BY
ATTORNEYS.

Feb. 19, 1929.

G. K. DAVOL 1,702,467

INTERNAL COMBUSTION ENGINE

Filed Oct. 26, 1925   5 Sheets-Sheet 5

INVENTOR.
George K. Davol.
BY
ATTORNEYS.

Patented Feb. 19, 1929.

1,702,467

UNITED STATES PATENT OFFICE.

GEORGE K. DAVOL, OF SAN FRANCISCO, CALIFORNIA; ELIZABETH DAVOL STRAUSS, BY DECREE OF DISTRIBUTION, HEIR OF SAID GEORGE K. DAVOL, DECEASED.

INTERNAL-COMBUSTION ENGINE.

Application filed October 26, 1925. Serial No. 64,746.

My invention relates particularly to that type of internal combustion engine illustrated and described in United States Patent application now Patent No. 1,656,884, Jan. 17, 1928.

This type of engine is characterized by a shaft carrying two inclined crank pins on which are mounted wabbling frames or "wabblers" which wabblers have connection with pistons reciprocating in cylinders substantially parallel to the shaft. In this particular type of engine two pistons reciprocate in each cylinder in opposite directions, each piston thrusting against one of the two wabblers so that the thrusts of any two pistons in any one cylinder, in opposite directions, are finally counteracted by a resulting tension in the shaft.

My present invention has for its objects the production of an engine of this type suitable to be made in moderate and large sizes for marine, stationary, or locomotive work, which shall have a large degree of accessibility, which shall be adapted to simple and economical methods of manufacture, which shall be of very compact form and light weight, and in which the main shaft can be set closely to the bed plate or floor level. This last feature is of particular value in marine engines of long stroke where the height of the shaft above the tank tops of the vessel is restricted.

By the term "accessibility", I refer to the easy and practicable means provided, for withdrawing and removing the pistons, for inspecting and removing the main shaft and shaft bearings, for reaching and removing the fuel valves and starting air valves attached to the lower cylinders, and for conveniently reaching the guiding shoes which prevent the wabblers from revolving with the shaft, and other similar provisions.

These and other features of design, all combining to produce a feasible and practical engine which can be economically manufactured, are more fully described hereinafter, in connection with the accompanying drawings, in which:—

Figure 1 is a view of the whole engine, one-half or end being shown as a side elevation, and the other half or end being a vertical longitudinal section taken on a plane passing through the axis of the main shaft;

Fig. 2 is a "front" or end view of one of the wabbling frames, carried on the inclined crank pins;

Fig. 3 is a partial section taken on a horizontal plane passing through the axis of the shaft, showing one end of the engine only;

Fig. 4 is an end view of the center portion of the shaft showing the face of the flange;

Fig. 5 is a partial section taken on a horizontal plane passing through the axes of the two lower cylinders, or on the line A—A of Figs. 1, 6, 7 and 8, and showing a portion of one end of the engine only, with certain parts being omitted;

Fig. 6 is a half cross section taken on a vertical plane normal to the axis of the shaft and passing through the exhaust ports of two cylinders, or on the lines B—B of Figs. 1, 3 and 5;

Fig. 7 is a similar half cross section taken on a vertical plane passing through the scavenging air ports of two cylinders or on line C—C of Fig. 1;

Fig. 8 is a cross section taken on vertical planes indicated by the line D—D—D—D in Fig. 3, looking inward or toward the cylinders;

All parts shown and referred to are given the same reference numerals in all the drawings.

Figure 9:
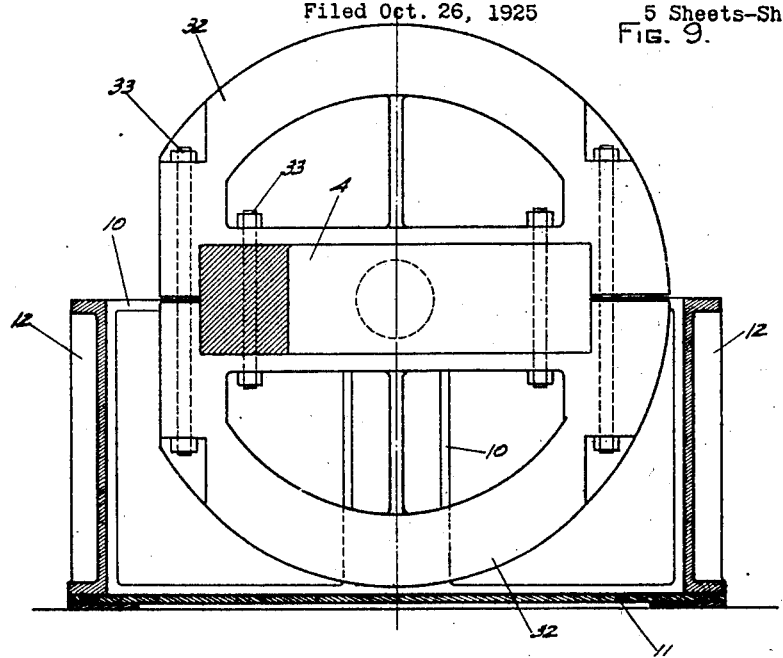
Fig. 9 is a cross section taken on a vertical plane normal to the axis of the shaft and passing through a portion of the crank arm, or on the line E—E of Fig. 3, looking outward or away from the cylinders.

The engine as herein described and shown in the drawings is of the fuel injection type of oil engine, but it is obvious that a large part of my invention can be embodied in a carbureting engine, or in a gas engine, in which the fuel is mixed with the air charge before admission to the cylinder.

In some features, however, particularly with reference to the arrangement and accessibility of the fuel valves, my invention has particular application to the fuel injection type of engine.

Referring to the drawings, the engine comprises a main shaft consisting of three separate parts, viz, a straight center portion 1 having flanged ends, and two end cranked portions, each preferably made in one piece and consisting of a cylindrical connecting part 2, an inclined crank pin 3, an outer crank arm 4 of rectangular cross section, and an outer journal 5. The inner face of the cylindrical part 2 is normal to the axis of the shaft while its outer face is oblique to the shaft axis and normal to the axis of the crank pin 3.

It may here be noted that in these specifications, and in the claims which follow, I use the terms "inward" or "inner" to designate the direction from the ends of the engine toward the center or cylinders, and the terms "outward" or "outer" to designate the opposite direction, or from the cylinders toward the ends of the engine.

These end portions of the shaft are connected to the center portion by bolted flanged connections, as shown clearly in Fig. 3. As there shown, the circular flanges on each end of the center portion of the shaft match with the cylindrical connecting parts 2 carried by each end portion, and the joint is made secure by a number of bolts or studs 6, only two of which are shown in Fig. 3, to avoid complicating the drawing, but which are intended to be suitably spaced around the flanges, as shown in Fig. 4, which is a face, in end view, of one of the flanged ends of the center portion of the shaft. There is also male and female connection, making this joint more secure, comprising the cylindrical projection 7 extending from the face of the flanged end of the center portion of the shaft into a cylindrical recess formed in the connecting part 2, as shown in dotted line in Fig. 3.

At the center of the engine is located a cylinder holding body through which the shaft passes. This cylinder holding body is made in at least two separable parts, a lower part 8 and an upper part 9. The lower part 8 carries two bearings for the center portion of the shaft 1.

At each end of the engine is located an end bearing frame 10, each of which carries a bearing for the outer or end journal 5 of the shaft.

These end bearing frames 10 and the lower cylinder holding body 8 rest on a bed plate 11, and are also secured to and embraced between two side frames 12, which extend the entire length of the engine, and which are secured to the bed plate 11.

This structure, comprising the longitudinal members, constituted by the bed plate 11 and side frames 12; and the cross members, constituted by the cylinder holding body 8 and the end bearing frames 10, forms the frame of the engine, and is very stiff against vertical and lateral bending stresses as well as against torsional stresses.

This construction forms two crank chambers, one at each end of the engine between the center cylinder holding body and the end bearing frame. Within these crank chambers the inclined crank pins and their crank arms revolve.

Both the lower and the upper parts of the cylinder holding body 8 and 9 either carry or have formed integrally with them, two open ended cylinders 13, which are disposed substantially parallel to the axis of the shaft.

In Fig. 5, which is a partial horizontal section, through the lower cylinder holding body 8, two cylinders are partially shown. One of the cylinders is there shown as being formed integrally with the cylinder holding body 8, while the other cylinder is shown in the form of a separate water jacketed part inserted and held within it. Either form of construction may be followed.

Within each of the four cylinders 13, two pistons 14 reciprocate, and each of these two pistons in any one cylinder is connected by a rod 15 to one of the wabbling frames or "wabblers" 16, one of which is carried on each of the inclined crank pins 3.

The wabbling frames 16 ride loosely on the pins 3 and each is prevented from revolving by a sliding shoe or slipper 17, which is carried at the end of an arm extending from one side of the wabbler, as shown in Fig. 2. The sliding shoe 17 oscillates back and forth in a horizontal plane within the guides 18, as is clearly shown in Fig. 3. The guides 18 are attached to the upper edge of one of the side frames, as shown in the cross section of Fig. 8.

Assuming that the two crank pins 3 are at each end of the engine, lie in the same plane, then the action of the mechanism just described is that rotation of the shaft will impart to the two pistons in any one cylinder, exactly opposite movement, or vice versa, opposite reciprocation of the pistons will rotate the shaft.

The engine as here described is designed to operate on the two-stroke cycle, and the cylinders are provided with exhaust ports in their walls at one end, and with scavenging air ports in their walls at the opposite end. The movement of the two pistons in any one cylinder is so adjusted that the piston at one end of the cylinder uncovers the exhaust ports at the end of its stroke, and the other piston in the same cylinder uncovers the scavenging air ports at the end of its stroke. Scavenging air under suitable pressure is supplied from any suitable source, and the action of the engine is essentially the same as that of any two-stroke cycle engine having two pistons reciprocating in opposite directions in one cylinder. The exhaust ports are opened or uncovered a suitable period in advance of the uncovering of the scavenging air ports, so that the pressure as the cylinder is relieved before scavenging of the cylinder commences.

The two ends of the engine on each side of the center line F—F in Fig. 1 are the same excepting for the differences due to one end of each cylinder being an exhaust end and the other end a scavenging air end.

Fig. 6 shows a half cross section taken through the exhaust ports 36 of two of the cylinders, while Fig. 7 shows a similar half cross section taken through the scavenging air ports 37 of two of the cylinders. At the exhaust end proper provision is made for water jacketing the exhaust passages while no water jacketing is required at the scavenging air end for the air passages.

In Fig. 5 one of the pistons, shown in section, is shown at the end of its stroke and the exhaust ports 36 which it controls are shown fully uncovered or open. The scavenging air ports are similarly uncovered by the opposite piston of the same cylinder at the end of its stroke.

The two ends of the cylinder holding body, both the lower part 8 and the upper part 9 are not, therefore, of identical design, as one end constitutes the exhaust box or passages and the outer end the scavenging air box or passages. It is advantageous from a constructional standpoint to make the upper and the lower parts of the cylinder holding body each of two separate parts, one for the exhaust end and one for the scavenging air end. This construction, with the cylinders formed of separate water jacketed barrels inserted into and connecting the two ends of the cylinder holding body, is my preferred construction.

In Fig. 6, which shows a partial cross section through the exhaust passages and ports 36, it is seen that the exhaust gases from the lower cylinder pass upward through a passage in the upper part of the cylinder holding body, and are finally led away from the top. In like manner, the exhaust from both cylinders could, if desired, be led away from the lower cylinder holding body by reversing this movement of gases. In either case the exhaust from either upper or lower cylinder must pass through a connected passage leading from the lower cylinder holding body 8 and the upper cylinder holding body 9, or vice versa. This requires that the upper and lower parts of the cylinder holding body be tightly joined together on the horizontal joint plane, and that the passage openings in the joining faces come together or register, making a continuous gas tight passage between the upper and lower parts.

At the scavenging air end of the cylinder, as shown in Fig. 7, the air passages form a large air receiving space, due to the absence of water jackets. At this end, as at the exhaust end, the air passages in the upper body 9 connect with the air passages in the lower body 8 through openings formed in the joint faces of the upper and lower parts, which are secured together to make this joint tight against escape of air. The scavenging air is supplied from any suitable source under suitable pressure and may be admitted to the air passages at the top as shown in Fig. 7, or at any convenient point.

Cylindrical extensions 19 are attached to each end of each cylinder and are not necessarily water jacketed. Their primary function is to provide for the convenient withdrawal of the pistons. A secondary purpose is to provide a removable overhang for the top cylinders, the removal of which permits access to the main shaft center bearings and the removal of the bearing caps.

In Fig. 5, the piston shown at the lower part of the figure is at the extreme outward end of its stroke. This wabbling frame to which the outer ends of the connecting rods 15 are connected is not shown, but the outer spherical ends of the rods which bear in the sockets formed in the wabbling frame 16, as indicated in Figs. 1 and 3, are shown in their proper relative positions. From this figure it can be seen that if the piston be disconnected from the inner end of its rod 15 and pushed back into the cylinder, and then the cylinder extension 19 disconnected from its cylinder by taking out the top bolts 20, the inner end of the rod together with the cylinder extension piece 19 can be swung through the opening 21 and the extension piece entirely withdrawn outside the frame. If now the inner end of the rod be swung back inside the crank chamber and dropped until it rests on the bed plate 11, the piston can be freely withdrawn from its cylinder and passed through the opening 21. The drawing shows in dot and dash lines the position of the rod and cylinder extension as the latter is being withdrawn through the opening in the side frame.

The center portion of the shaft is supported in two bearings 22 carried by the lower part of the cylinder holding body 8. These bearings are provided with separate caps 23 which may be adjustable and which are bolted down securely to the lower body 8. These bearings must be accessible and the caps removable, and at the same time it is necessary that they be set back between the outer ends of the cylinders. These requirements are met through the use of the cylinder extension pieces 19 on the two upper cylinders. When these extensions are removed the bearing caps 23 are completely accessible and can be lifted vertically without interference.

The wabbling frames 16 carried on the inclined crank pins 3 are made in two separable parts or halves which are bolted together on a plane face joint and so made to embrace the crank pins as shown in Fig. 2.

At one side of each of the wabbling frames projects an arm. This arm, as shown in Figs. 2 and 3, has its axis lying in the plane of the joint of the two halves and intersecting the axis of the crank pin 3. This arm carries at its outer end a pin 24 which is clamped between the two halves of the arm or otherwise secured to it. On this pin the sliding shoe 17 is carried.

As indicated in Figures 1 and 3, the axes of the crank pins 3 are intended to intersect the axis of the shaft, and the axis of the pin 24 carrying the sliding shoe 17 is also intended to intersect the shaft and crank pin axes at the same point. This exact intersection of these three axes is, however, not absolutely essential, and may, owing to inaccuracy of workmanship, be difficult to always insure. A certain latitude is allowable here and these axes may all fail to intersect within a reasonable limit, without materially bad effect, provided that the sliding shoe 17 is mounted on the extending arm of the wabbling frame in such a manner that a certain degree of universal flexibility is allowed. If these axes fail to intersect, the axis of the wabbling frame arm will not oscillate in a plane, while the shoe 17 must always move within the plane of the guides 18. This required flexible mounting is provided by a form of universal joint, comprising the pin 24 carrying the block 25, which has formed on it two pins 26, the axis of which is perpendicular to the axis of the pin 24. On these pins 26 the sliding shoe is mounted, as shown in Figs. 3 and 8.

It should be fully recognized, as I have just explained, that while it is the intention that the axes of the crank pin and shaft intersect, and that they are referred to in this specification and in the claims which follow as intersecting, still a limited deviation from exact intersection, whether due to accident or poor workmanship or to intentional design, will not materially affect the co-operation of parts, and any such deviation is intended to be covered by the wording of my claims.

Each of the wabbling frames 16 take the thrust of the pistons 14 through the rods 15 and transmit this thrust to the shaft through a thrust bearing. This thrust bearing comprises a split thrust collar 27 made in halves, clamped to the crank pin 3, and bearing against a shoulder 28 formed on the crank pin. Separate bearing shoes 29 bear against the face of the collar, taking the thrust through a spherically seated equalizing ring 30, which is provided to equalize the pressure on the shoes. The shoes 29 are free to tilt or adjust themselves to the surface of the collar 27 and to the form of intervening oil film.

Fig. 3 shows the lower half of one of the wabbling frames in place, the upper half being removed. This shows the face of the connecting flanges with the bolts 31 used to secure together the two halves. This joint face lies in a plane preferably passing through the crank pin axis.

When fully assembled the wabbing frames 16 form hollow chambers enclosing the thrust bearing parts, and are intended to be kept filled with lubricant by a continuous supply of oil.

The placing of the guides 18 at the side of the crank chamber instead of at the bottom of it, and extending the guiding arm of the wabbling frame sidewise instead of downward, renders it feasible to make the height of the crank shaft above the base plate considerably less than if vertical height had to be allowed for the accommodation of the guides and the swing of the guiding arm. This is a considerable advantage in certain cases, particularly in long stroke marine engines where the height of the shaft above the vessel's bottom is sometimes restricted.

The outer crank arm 4 is rectangular in section as indicated in Figs. 1, 3 and 5, and this form facilitates the attachment thereto of the flywheel 32 that is made in halves and clamped on the flat crank arm sides by the bolts 33. This results in economizing length and entirely enclosing the flywheel, which revolves inside the crank chamber. This arrangement of proportioning and placing parts is facilitated by the fact that the end bearing frames are entirely relieved of any end thrust, which is entirely counteracted by the balanced tension produced in the shaft. This in turn allows of a wide spread between the side frames without disadvantage, and so permits the accommodation of the flywheel between the side frames and within the crank chamber. The flywheel is shown flattened on one side for counter-weighting purposes.

The fuel and starting air valves open into the cylinders at their center points. The starting air and relief valves are not shown, but the fuel valves 34 are partly shown in Fig. 1, and more fully shown in the cross section view in Fig. 10, where the fuel valve bodies are indicated extending through the cylinder walls into the compression space.

Figure 10:
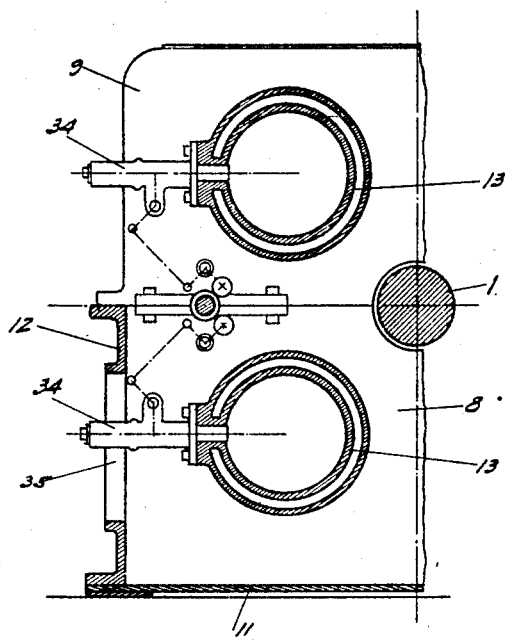
Fig. 10 is a half cross section taken on a vertical plane normal to the axis of the shaft, or on the line F—F in Fig. 1, and showing the fuel injection valves, in two of the cylinders.

These fuel valves must be accessible and readily removable and to insure this an opening 35 is made in the side frames 12 at their center point, opposite the fuel valve opening in the lower cylinders. This arrangement is shown in Fig. 10 and provides for convenient access to and removal of the fuel valves in the lower cylinders. It is essential that the side frames run continuously from end to end of the engine, as the stiffness of the whole frame structure is dependent upon this. The opening 35 in the center of the frame, however, does not importantly weaken it.

In this specification and in the claims which follow I have confined my description to the form of construction embodying an open ended cylinder having two pistons reciprocating within it. It must be recognized that this language is intended to cover equivalent constructions such as might be described as two aligned cylinders having connection at their inner ends, and each having a piston reciprocating within it. It is not even essential that two such cylinders, which may be regarded as separate, be exactly aligned, or have a common axis, as long as they have proper connection at their inner ends. The essential construction that I intend to cover is that two pistons reciprocate in bores in substantially opposite directions and that the bores communicate at their inner ends. The bores may be coaxial and formed in one part, or they may have separate axes and may be formed in separate parts.

I claim:

1. In an engine, the combination of a shaft having two inclined crank pins, wabbling frames mounted on the said crank pins, cylinders disposed substantially parallel to the said shaft, two pistons reciprocating in each of the said cylinders, connections between the said pistons and the said wabbling members, a central cylinder holding body through which the said shaft passes, a crank chamber at each end of the said cylinder holding body, end bearing frames closing the outer end of said crank chambers, side frames connecting the said end bearing frames to the said central cylinder holding body and forming sides of the said crank chambers, guides attached to the said side frames, a guiding part attached to each of said wabbling members and engaging with said guides.

2. In an engine, the combination of a substantially horizontal shaft having two inclined crank pins, wabbling frames carried on the said inclined crank pins, the said wabbling frames being made in two separable halves, and having an extending guiding arm, the said arm being formed partly on each of the said separable halves, stationary guides engaging with the said guiding arm, cylinders disposed substantially parallel to the said shaft, pistons in the said cylinders and connections between the said pistons and the said wabbling members.

3. In an engine, the combination of a substantially horizontal shaft having two inclined crank pins, wabbling frames mounted on the said crank pins, cylinders disposed substantially parallel to the said shaft, two pistons reciprocating in each of the said cylinders, connections between the said pistons and the said wabbling members, a central cylinder holding body comprising upper and lower parts, the said shaft passing between the said upper and lower parts and resting in bearings carried by the said lower part or parts, bearing caps for the said bearings, the said bearing caps being separate from the said upper and lower parts of the said cylinder holding body.

4. In an engine, the combination of a substantially horizontal shaft having two inclined crank pins, wabbling frames mounted on the said crank pins, cylinders disposed substantially parallel to the said shaft, two pistons reciprocating in each of the said cylinders, connections between the said pistons and the said wabbling members, a central cylinder holding body comprising upper and lower parts, the said shaft passing between the said upper and lower parts and resting in bearings carried by the said lower part or parts, bearing caps for the said bearings, the said bearing caps being separate from the said upper and lower parts of the said cylinder holding body and being secured to the said lower part by bolts.

5. In an engine, the combination of a shaft having two inclined crank pins, wabbling frames mounted on the said crank pins, a central cylinder holding body comprising separable upper and lower parts, cylinders substantially parallel to the said shaft formed in or held by the said cylinder holding body, two pistons reciprocating in each of the said cylinders, connections between the said pistons and the said wabbling members, bearings for the said shaft carried by the said lower part or parts of the said cylinder holding body, bearing caps for the said bearings, the said bearing caps being separate from the said upper and lower parts of the said cylinder holding body, the said bearing and caps entering, or being held within a space between the walls of the said cylinders.

6. In an engine, the combination of a shaft having two inclined crank pins, wabbling frames mounted on the said crank pins, a central cylinder holding body comprising separable upper and lower parts, the two upper cylinders formed in or held by the said upper part, and two lower cylinders formed in or held by the said lower part of the said cylinder holding body, the said cylinders being substantially parallel to the said shaft, removable cylinder extensions which extend from the bores of each cylinder at each end thereof, bearings for the said shaft carried by the said lower part or parts of the said cylinder holding body, bearing caps for the said bearings, the said bearing caps being below and between the said cylinder extensions of the said two upper cylinders.

7. In an engine, the combination of a shaft having two inclined crank pins, wabbling frames mounted on the said crank pins, a central cylinder holding body through which the said shaft passes, cylinders substantially parallel to the said shaft formed in or held by the said cylinder holding body, removable cylinder extensions which extend from the bores of each cylinder at each end thereof, two pistons reciprocating in each of the said cylinders, connecting rods connecting the said pistons with the said wabbling frames, the said connecting rods when disconnected from the said pistons, and still connected to the said wabbling frames, swinging clear of the said cylinders and cylinder holding body when the said removable cylinder extensions are removed.

8. In an engine, the combination of a shaft having two inclined crank pins, wabbling frames mounted on the said crank pins, a central cylinder holding body comprising two upper and two lower parts, one of the said upper and one of the said lower parts having exhaust passages therein, and the other upper and lower parts having scavenging air passages therein, cylinders substantially parallel to the said shaft held by the said upper and lower parts of the said cylinder holding body.

9. In an engine, the combination of a shaft having two inclined crank pins, wabbling frames mounted on the said crank pins, a central cylinder holding body comprising two upper and two lower parts, one of the said upper and one of the said lower parts having exhaust passages therein, and the other upper and lower parts having scavenging air passages therein, cylinders substantially parallel to the said shaft held by the said upper and lower parts of the said cylinder holding body, a bed plate on which the said lower parts of the said cylinder holding body rest, and side frames secured to and connecting the said lower parts of the said cylinder holding body.

10. In an engine, the combination of a shaft comprising two inclined crank pins, two end journals outside of the crank pins and two inner journals between the crank pins, wabbling frames mounted on the said crank pins, a central cylinder holding body comprising two upper and two lower parts, two inner bearings for the said shaft carried by the said two lower parts of the said cylinder holding body, two end bearing frames carrying two end bearings for the said shaft, a base plate on which the said two lower parts of the said cylinder holding body and the two end bearing frames rest, two side frames secured to the said base plate, and also secured to and connecting the said lower parts of the said cylinder holding body and the said two end bearing frames, and cylinders substantially parallel to the said shaft held by the said cylinder holding body.

11. In an engine, the combination of a shaft comprising two inclined crank pins, two end journals outside of the crank pins and two inner journals between the crank pins, a central cylinder holding body carrying bearings for the said shaft, two end bearing frames carrying two end bearings for the said shaft, a base plate on which the said end bearing frames and the said central cylinder holding body rest, two side frames secured to the said base plate and also secured to and embracing between them the said end bearing frames and the said cylinder holding body.

12. In an engine, the combination of a shaft having two inclined crank pins, wabbling frames mounted on the said crank pins, a central cylinder holding body comprising separable upper and lower parts, the said upper and lower parts each having passages for scavenging air and exhaust gases, and being connected together on plane surface joints, the said joint surfaces having connecting openings forming passages for air and exhaust gases between the said upper and lower parts, bearings for the said shaft carried by the said lower part or parts of the said cylinder holding body, two pistons reciprocating in each of the said cylinders, and connections between the said pistons and the said wabbling members.

13. In an engine, the combination of a shaft having two inclined crank pins, wabbling frames mounted on the said crank pins, a central cylinder holding body comprising separable upper and lower parts, the said upper and lower parts being joined on a substantially horizontal joint plane, the said joint plane having openings forming connecting passages for air and exhaust gases between the said upper and lower parts, bearings for the said shaft carried by the said lower part or parts of the said cylinder holding body, cylinders substantially parallel to the said shaft formed in or held by the said cylinder holding body, two pistons reciprocating in each of the said cylinders, and connections between the said pistons and the said wabbling members.

14. In an engine, the combination of a shaft comprising two inclined crank pins, two end journals outside of the crank pins and two inner journals between the crank pins, a central cylinder holding body carrying bearings for the said shaft, two end bearing frames carrying two end bearings for the said shaft, cylinders substantially parallel to the said shaft formed in or held by the said cylinder holding body, two pistons reciprocating in each of the said cylinders, two side frames secured to and embracing between them the said end frames and the said cylinder holding body, the said side frames having openings formed in them between the said cylinder holding body and the said end bearing frames, the said openings being large enough to permit the withdrawal of the said pistons through them, wabbling frames mounted on the said crank pins, and connections between the said pistons and the said wabbling members.

15. In an engine, the combination of a substantially horizontal shaft having two inclined crank pins, wabbling frames mounted on the said crank pins, a central cylinder holding body through which the said shaft passes, cylinders substantially parallel to the said shaft formed in or held by the said cylinder holding body, two pistons reciprocating in each of the said cylinders, connections between the said pistons and the said wabbling members, two end bearing frames carrying two end bearings for the said shaft, side frames connecting the said cylinder holding body to the said end bearing frames, guides attached to the said side frames, a guiding part attached to each of said wabbling members and engaging with said guides, the said side frames having openings formed in them below the said guides of a size permitting the withdrawal of the said pistons through them.

16. In an engine, a three piece shaft comprising a straight central portion having flanges at each end and also comprising two cranked end portions, each of the said cranked portions comprising a cylindrical inner end with one face oblique to its axis, a crank pin perpendicular to and joining said oblique face, an outer crank arm and an outer cylindrical journal, and means securing the said flanges of the said central portion to the said cylindrical inner ends of the said cranked portions.

17. In an engine, the combination of a shaft and flywheel consisting of a three piece shaft comprising a straight central portion having flanges at each end and also comprising two cranked end portions, each of the said cranked portions carrying an inclined crank pin, the axis of which intersects the axis of the shaft, the point of intersection of the said axes being nearer the inner end of the said crank pin than its outer end, the said crank pin connecting with an outer crank arm of rectangular cross section, and a fly wheel made in two parts, the said two parts being secured to and embracing between them one of the said outer crank arms.

18. In an engine, the combination of a three piece shaft comprising a straight central portion and two cranked end portions, each of said cranked portions having an inclined crank pin, the axis of which intersects the axis of the shaft, an outer crank arm of rectangular cross section, and an outer journal beyond the said outer crank arm, a central cylinder holding body through which the said shaft passes, a crank chamber at each end of the said cylinder holding body, end frames carrying bearings for the said shaft and closing the outer ends of the said crank chambers, and a flywheel made in two parts, the said two parts being secured to and embracing between them one of the said outer crank arms.

19. In an engine, the combination of a shaft having two inclined crank pins, wabbling frames, mounted on the said crank pins, stationary guides, guiding slippers or shoes moving in the said stationary guides, the said guiding slippers or shoes being attached to the said wabbling frames through intervening blocks, with which said intervening blocks both the wabbling frames and the said slippers have pivotal connection.

20. In an engine, the combination of a shaft having two inclined crank pins, wabbling frames mounted on the said crank pins, a central cylinder holding body through which the said shaft passes, cylinders substantially parallel to the said shaft formed in or held by the said cylinder holding body, two pistons reciprocating in each of the said cylinders, connections between the said pistons and the said wabbling members, end bearing frames closing the outer end of said crank chambers, a side frame on each side of the said cylinder holding body and connecting with the said end bearing frames, valve bodies attached to the said cylinders, the said side frames having openings through which the said valve bodies can project or can be withdrawn.

21. In an engine, the combination of a shaft having two inclined crank pins, wabbling frames mounted on the said crank pins, a central cylinder holding body through which the said shaft passes, cylinders substantially parallel to the said shaft formed in or held by the said cylinder holding body, two pistons reciprocating in each of the said cylinders, connections between the said pistons and the said wabbling members, end bearing frames closing the outer end of said crank chambers, a side frame on each side of the said cylinder holding body and connecting with the said end bearing frames, valve bodies attached to the said cylinders, the said side frames having openings through which the said valve bodies can project or can be withdrawn, the said cylinders having openings in their walls for the reception of fuel or air valve bodies, and the said side frames having openings substantially opposite the said openings in the walls of the said cylinders allowing access to and withdrawal of the said fuel or air valve bodies.

In witness whereof, I hereunto subscribe my name this 24th day of October, 1925.

GEORGE K. DAVOL.